United States Patent [19]

Torbey

[11] Patent Number: 4,858,017
[45] Date of Patent: Aug. 15, 1989

[54] SYSTEM AND METHOD FOR HIERARCHAL IMAGE ENCODING AND DECODING

[75] Inventor: Habib H. Torbey, New York, N.Y.

[73] Assignee: The Trustees of Columbia University in the City of New York, New York, N.Y.

[21] Appl. No.: 146,781

[22] Filed: Jan. 22, 1988

[51] Int. Cl.$^4$ .............................................. H04N 4/17
[52] U.S. Cl. ............................... 358/426; 358/261.3; 358/470; 382/56
[58] Field of Search ...................... 358/260, 261, 263; 382/37, 56

[56] References Cited

U.S. PATENT DOCUMENTS

| | | | |
|---|---|---|---|
| 4,222,076 | 9/1980 | Knowlton | 358/263 |
| 4,673,987 | 6/1987 | Toyokawa | 358/260 |
| 4,698,689 | 10/1987 | Tzou | 358/260 |
| 4,701,806 | 10/1987 | Nagashima | 358/287 |
| 4,712,140 | 12/1987 | Mintzer et al. | 358/260 |

OTHER PUBLICATIONS

Ken Knowlton, "Progressive Transmission of Grey-Scale and Binary Pictures by Simple, Efficient, and Lossless Encoding Schemes", *Proc. IEEE*, vol. 68, No. 7, Jul. 1980, pp. 885-896.

E. Dubois and J. L. Moncet, "Encoding and Progressive Transmission of Still Pictures in NTSC Composite Format Using Transform Domain Methods", IEEE Trans. on Comm., vol. COM 34, No. 3, Mar. 1986, pp. 310-319.

Peter J. Burt and Edward H. Adelson, "The Laplacian Pyramid as a Compact Image Code", *IEEE Trans. on Comm.*, vol. Com. 31, No. 4, Apr. 1983, pp. 532-540.

Limin Wang and Morris Goldberg, "Progressive Image Transmission by Multistage Transform Coefficient Quantization", CH2314-3186/0000-0419, 1986 IEEE, pp. 419-423.

Kou-Hu Tzou and Sharaf E. Elnahas, "Bit-Sliced Progressive Transmission and Reconstruction of Transformed Images", CH2243-4/86/0000-0533 1986 IEEE, pp. 533-536.

Amalie J. Frank, J. D. Daniels, "Progressive Image Transmission Using a Growth-Geometry Coding", *Proc. IEEE*, Jul. 1980, pp. 897-909.

William D. Hofmann and Donald E. Troxel, "Making Progressive Transmission Adaptive", *IEEE Trans. on Comm.*, vol. Com-34, No. 8, Aug. 1986, pp. 806-813.

Primary Examiner—James J. Groody
Assistant Examiner—Kim Yen Vu
Attorney, Agent, or Firm—Brumbaugh, Graves, Donohue & Raymond

[57] ABSTRACT

Hierarchal encoding of an image is achieved by first deriving a picture element array of binary coded intensity values representing the image and then deriving from the intensity values of the picture element array a sequence of hierarchal codes consisting of one of the intensity values as the first code followed by n−1 cyclic differences between n−1 distinct pairs of intensity values, where n is the total number of intensity values of the picture element array. The distinct pairs of intensity values are systematically selected by making alternating horizontal and vertical passes through the picture element array of intensity values. In each horizontal pass, consecutive nonoverlapping adjoining pairs of intensity values are selected along consecutive rows of the picture element array and successive undersampled arrays, the undersampled array for a horizontal pass being constructed by eliminating every other row from the undersampled array for the preceding vertical pass. In each vertical pass consecutive vertically adjoining pairs of intensity values are selected along consecutive nonoverlapping adjacent pairs of rows of successive undersampled arrays, the undersampled array of a vertical pass being constructed by eliminating every other column from the picture element array or the undersampled array for the preceding horizontal pass. The sequence of hierarchal codes may be compressed with variable length coding prior to transmission or storage. Decoding of the sequence of hierarchal codes to reconstruct the picture element array of intensity values follows the inverse of the encoding procedure, in which the first code of the sequence is the intensity value of a designated position of the picture element array, and the other intensity values are derived by taking the cyclic difference between decoded intensity values and successive hierarchal codes in alternating horizontal and vertical passes corresponding to those used in the encoding procedure.

21 Claims, 8 Drawing Sheets

Microfiche Appendix Included
(1 Microfiche, 34 Pages)

1st HORIZONTAL PASS
p=1, pp=0
n=3, m=2

0 0 0 1 3 3 2 2 3 2 0 2 0 2 0 0

1st VERTICAL PASS
p=1, pp=1

0 0 0 1 3 3 2 2 3 2 0 2 0 2 0 0 0 0 0 0 3 3 0 0 2

2nd HORIZONTAL PASS
p=2, pp=1

0 0 0 1 3 3 2 2 3 2 0 2 0 2 0 0 0 0 0 3 3 0 0 2 3 2 0 1

2nd VERTICAL PASS
p=2, pp=2

0 0 0 1 3 3 2 2 3 2 0 2 0 2 0 0 0 0 0 3 3 0 0 2 3 2 0 1 0 0

3rd HORIZONTAL PASS
p=3, pp=2

0 0 0 1 3 3 2 2 3 2 0 2 0 2 0 0 0 0 0 3 3 0 0 2 3 2 0 1 0 0 2

STORE V(0,0)

0 0 0 1 3 3 2 2 3 2 0 2 0 2 0 0 0 0 0 3 3 0 0 2 3 2 0 1 0 0 2 0

506                                                                505
 \                                                                /
 0 0 0 1 3 3 2 2 3 2 0 2 0 2 0 0 0 0 3 3 0 0 2 3 2 0 1 0 0 2 0
                              501

| VALUE | NO. OF OCCURRENCES |
|-------|--------------------|
| 0     | 16                 |
| 1     | 2                  |
| 2     | 8                  |
| 3     | 6                  |

502

| HUFFMAN CODE | VALUE |
|--------------|-------|
| 0            | 0     |
| 1 0          | 2     |
| 1 1 0        | 3     |
| 1 1 1        | 1     |

SYSTEM AND METHOD FOR HIERARCHAL IMAGE ENCODING AND DECODING

A microfiche appendix containing 34 frames on 1 card is included in the specification and is hereafter referred to as Appendix I.

BACKGROUND OF THE INVENTION

The present invention relates to the encoding of a pictorial or textual image to provide image data for transmission and storage and the decoding of such image data to reconstruct the image. More particularly, the present invention relates to the hierarchal encoding of such images to provide sequential image data representing progressively improved approximations of the image and the decoding of such hierarchal image data.

Hierarchal encoding of images is known and has been proposed as an alternative to conventional line-by-line image encoding techniques for the transmission of images over communication channels of restricted bandwidth. Using hierarchal encoding, data corresponding to gross approximations of an image are transmitted first, followed by data corresponding to more refined approximations until the final image is transmitted. Therefore, the quality of the reconstructed image at the receiver is progressively improved as more image data is received.

One of the principal advantages of progressive image transmission using hierarchal encoding is the early recognition of the received image before transmission of the final image is completed. This is so because in many instances an early coarse approximation of an image is sufficient to permit identification of what is contained in the final image.

Related to early recognition of the transmitted image is the possibility of reducing the amount of data required for the transmission of an image. By aborting the transmission after receiving a satisfactory approximation of the image but before transmission of the final image is completed, the amount of data required for the transmission of the image is effectively reduced.

Hierarchal encoding of images is typically implemented by processing the information in an image to generate an explicit pyramidal data structure. Such a data structure contains multiple levels, each representing a successive approximation of the final image with the lowest level at the base of the pyramid representing the final image. Transmission of the pyramidal data structure begins at the highest level, i.e., at the vertex of the pyramid, followed by the transmission of successive lower levels.

Known techniques for implementing hierarchal encoding of images to obtain pyramidal data structures are described in U.S. Pat. No. 4,222,076 to Knowlton and U.S. Pat. No. 4,698,689 to Tzou. The Knowlton technique uses a look-up table based algorithm to format spatial domain gray-scale values of pixels into a pyramidal structure, each formatted value being the approximate average of paired gray-scale values. The Tzou technique takes the two-dimension transform of block encoded gray-scale values of pixels and quantizes the transform coefficients to obtain a pyramidal data structure.

The encoding and decoding functions used in Knowlton and Tzou require large computational and storage overhead for their implementation. Such overhead becomes a serious drawback when it is desired to implement a complete image coder-decoder (CODEC) as an integrated circuit, since the fabrication yield of such an integrated circuit decreases rapidly as the complexity or size of the circuit is increased. Therefore, a need clearly exists for a hierarchal, spatial domain image encoding and decoding technique using relatively simple encoding and decoding functions which do not require complex circuits, extensive computations or look-up tables for their implementation. Furthermore, a need exists for a hierarchal image encoding and decoding technique which provides high noise immunity and high data compression ratio, even without prematurely aborting the hierarchal transmission, when used in conjunction with an appropriate data compression output encoding technique, such as variable length encoding.

SUMMARY OF THE INVENTION

The foregoing shortcomings of the prior art are overcome and the aforementioned needs are substantially satisfied by the present invention, which in one aspect is an image encoding system having a memory storing a primary array of values representing an image. The primary array, which has M rows and N columns, may be the pixel intensity value array, a block encoded or sub-band encoded image array or a transform of the pixel intensity value array. The system further includes first encoding means for generating a sequence of hierarchal codes from the values in the primary array, the number of codes in the sequence being equal to the number of values in the primary array. The sequence of hierarchal codes, which is also stored in the memory, begins with X selected values from the primary array followed by Y respective cyclic differences of Y selected distinct pairs of values of the primary array, where X is an integer less than $M \times N$ and Y is an integer equal to $M \times N - X$. The encoding system is also provided with second encoding means for converting the sequence of hierarchal codes into a corresponding sequence of data-compressed output codes using known data compression output encoding techniques, such as variable length coding.

According to an exemplary embodiment of the encoding system of the invention, the values of the primary array are each binary codes having b bits and the sequence of hierarchal codes has as its first code a single selected primary array value followed by $M \times N - 1$ respective cyclic differences of $M \times N - 1$ selected distinct pairs of primary array values. The first encoding means in the exemplary embodiment comprises means for selecting the distinct pairs of primary array values by making alternating horizontal and vertical passes. In each horizontal pass a pair of primary array values, $V_1$ and $V_2$, are selected in accordance with the relations $V_1 = V(i,j)$ and $V_2 = V(i, j+2^{p-1})$, where $V(i,j)$ is the value in the $i^{th}$ row and $j^{th}$ column of the primary array, $V(i, j+2^{p-1})$ is the value in the $i^{th}$ row and $(j+2^{p-1})^{th}$ column of the primary array, i has values from 0 to $M-2^{pp}$ in steps of $2^{pp}$, j has values from 0 to $N-2^p$ in steps of $2^p$, p has values from 0 to $\log_2 M$ and is incremented by 1 before each horizontal pass, pp has values from 0 to $\log_2 N$ and is incremented by 1 before each vertical pass. In each vertical pass a pair of primary array values, $V_1$ and $V_2$, are selected in accordance with the relations $V_1 = V(i,j)$ and $V_2 = V(i+2^{pp-1}, j)$, where $V(i+2^{pp-1}, j)$ is the value in the $(i+2^{pp-1})^{th}$ row and $j^{th}$ column of the primary array. In addition, the encoding system of the exemplary embodiment includes means for taking the modulo K cyclic difference between each pair of first coded values, $V_1$ and $V_2$, selected in each horizontal and vertical pass, where $K=2^b$ and each modulo K difference has a position C in the sequence of second coded values determined by the relations $$C = (M \times N)\left(1 - \sum_{z=1}^{p+pp-1} \frac{1}{2^z}\right) - P \text{ and}$$

$$P = \left(\frac{j + 2^{pp}}{2^{pp}} - 1\right) \times \frac{N}{2^p} + \frac{i + 2^p}{2^p}.$$

Another aspect of the present invention is an image decoding system comprising means for receiving a sequence of output codes, such as variable length codes, representing an image, a memory, first decoding means for converting the sequence of output codes to a corresponding sequence of hierarchal codes stored in the memory. The decoding system further comprises second decoding means for generating a primary array of values having M rows and N columns from the sequence of hierarchal codes. The primary array of values is generated by taking the first X codes in the sequence of hierarchal codes as primary array values belonging to specified positions in the primary array and the following Y codes of the sequence as respective cyclic differences of Y distinct pairs of primary array values belonging to specified positions in the primary array, where X is an integer less than $M \times N$ and Y is an integer equal to $M \times N - X$. The primary array of values generated by the second decoding means is also stored in the memory, and the decoding system further includes third decoding means for converting the values in the primary array into display signals representative of the image.

According to an exemplary embodiment of the decoding system, the first code in the sequence of hierarchal codes is taken as a primary array value belonging to a specified position in the primary array and the following $M \times N - 1$ codes as respective cyclic differences of $M \times N - 1$ distinct pairs of primary array values belonging to specified positions in the primary array, each code in the sequence being a binary code of b bits. In addition, the second decoding means of the system includes means for deriving $M \times N - 1$ distinct pairs of primary array values from the sequence of hierarchal codes by making alternating horizontal and vertical passes. In each horizontal pass pairs of primary array values, $V_1$ and $V_2$, are derived from successive hierarchal codes, d, in accordance with the relations $V_1 = V(i,j)$ and $V_2 = (V_1 - d)_K = V(i, j + 2^{p-1})$, where $V(i,j)$ is the value in the ith row and $j^{th}$ column of the primary array, $V(i, j + 2^{p-1})$ is the value in the $i^{th}$ row and $(j + 2^{p-1})^{th}$ column of the primary array, i has values from $M - 2^{pp}$ to 0 in steps of $2^{pp}$, j has values from $N - 2^p$ to 0 in steps of $2^p$, p has values from $\log_2 N$ to 0 and is decremented by 1 after each horizontal pass, pp has values from $\log_2 M$ to 0 and is decremented by 1 after each vertical pass, and $(V_1 - d)_K$ is the modulo K cyclic difference between $V_1$ and d, where $K = 2^b$. In each vertical pass pairs of primary array values, $V_1$ and $V_2$, are derived from successive hierarchal codes, d, in accordance with the relations $V_1 = V(i,j)$ and $V_2 = (V_1 - d)_K = V(i + 2^{pp-1}, j)$, where $V(i + 2^{pp-1}, j)$ is the value in the $(i + 2^{pp-1})^{th}$ row and $j^{th}$ column of the primary array.

Still further aspects of the present invention are a method for encoding an image and a method for decoding an image as carried out, for example, by the foregoing image encoding system and image decoding system, respectively.

BRIEF DESCRIPTION OF DRAWING

The invention will be better understood from the following detailed description of the exemplary embodiments thereof taken in conjunction with the accompanying drawings, in which.

Throughout the figures of the drawings the same reference numerals are used to denote like components, parts, features and process steps.

DETAILED DESCRIPTION

Figure 1:
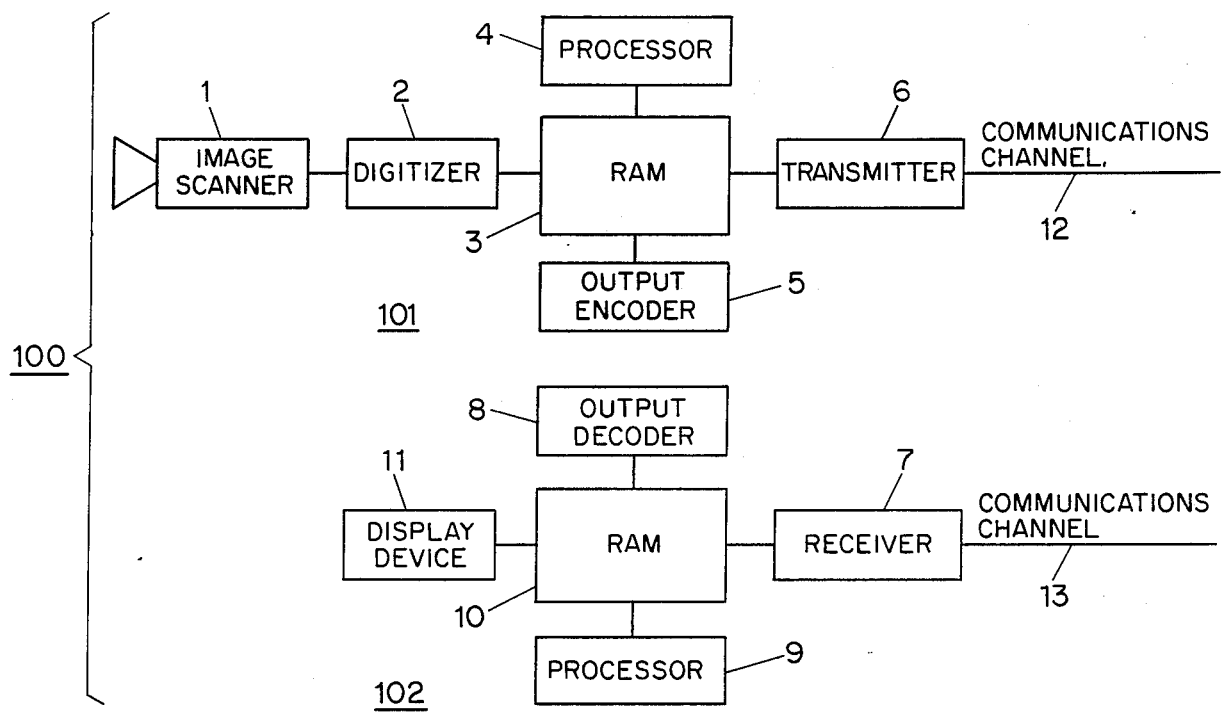
FIG. 1 is a block diagram of an image encoder-decoder system in accordance with an exemplary embodiment of the invention.

Referring now to FIG. 1, there is shown a block diagram 100 of an image coder-decoder system in accordance with an exemplary embodiment of the invention. The coder-decoder system 100 includes an encoder section 101 and a decoder section 102. The encoder section 101 has a conventional image scanner 1 for performing a line-by-line scan of an image (not shown) and providing analog signals representative of the scanned image. The image scanner 1 may be one which provides either gray-scale or color operation. In the case of gray-scale operation, the analog scan signals provided by the image scanner represent the light intensity values along each scan line. In the case of color operation, the analog scan signals provided by the image scanner represent the light intensity values along each scan line as obtained through red, green, and blue spectral filters, respectively. Thus, for color operation the image scanner provides three times the intensity value information provided in gray-scale operation. For purposes of the present invention, color images are encoded and decoded in the same manner as gray-scale images, except that the intensity values obtain through each spectral filter are encoded and decoded separately.

It should be noted that in certain special image scanning applications, such as the scanning of an astronomical image, the intensity values provided by the image scanner may be for electromagnetic radiation having wavelengths outside of the visible spectrum. Moreover, the principles of the present invention are equally applicable to images obtained with non-electromagnetic radiation such as sonar images.

Typically, the image scanner scans the image horizontally from left to right, beginning at the top of the image and progressing on a line-by-line basis to the bottom of the image. The number of scanning lines used depends on the desired vertical resolution, a typical number being 256 lines.

The encoder section 101 also includes a digitizer 2, which divides each scan line into a finite number of segments, called pixels. Furthermore, the digitizer 2 quantizes the light intensity value in each segment to a nearest preset value, i.e., a quantization level, and represents the quantized intensity value as a binary code. The conversion of the analog intensity value signals provided by the image scanner 1 into binary codes is called pulse code modulation (PCM), and each binary code represents the light intensity value of a particular pixel of the image. The number of pixels per scan line depends on the desired horizontal resolution, a typical number being 256 pixels per line. The number of bits used for the binary code representing the light intensity value of each pixel depends on the desired intensity value resolution. The higher the intensity value resolution, the greater is the number of bits required to represent the light intensity value of each pixel. The output of the digitizer 2 is commonly referred to as the digitized original image or pixel intensity value array.

It should be noted that the respective functions of the image scanner 1 and the digitizer 2 may be combined in a single device, called a digital scanner.

The digitized original image provided by the digitizer 2 is stored in a Random-Access Memory (RAM) 3 of the encoder section 101 as a primary array of binary coded intensity values, the primary array having M rows and N columns, where M is equal to the number of scan lines used and N is equal to the number of pixels per scan line. The digitizer 2 contains appropriate circuitry for addressing RAM 3 for writing the digitized image in respective locations thereof. The encoder section 101 further includes a conventional digital processor 4, which executes an encoding program routine for converting the digitized image stored in the RAM 3 into a sequence of hierarchal codes representing the digitized original image. The sequence of hierarchal codes are also stored in respective locations in the RAM 3.

The encoder section 101 of the image encoder-decoder system 100 has an output encoder 5 for converting the sequence of hierarchal codes stored in the RAM 3 into a corresponding sequence of appropriate output codes providing a lossless data compression of the sequence of hierarchal codes prior to transmission. The output codes, which are stored in the RAM 3, may be in the form of a known variable length code, such as the Huffman code. Furthermore, the encoder section 101 has a transmitter 6 for providing an appropriate carrier signal suitable for transmission over a communications channel 12. The transmitter 6 modulates the carrier signal with the sequence of output codes stored in the RAM 3. The communications channel 12 may be any suitable medium for conducting the modulated carrier signal from the transmitter 6, such as a telephone line, an optical fiber, a radio frequency or microwave wireless link.

The decoder section 102 of the image coder-decoder system 100 includes a receiver 7 coupled to a communications channel 13 for receiving a carrier signal modulated with an output encoded sequence of hierarchal codes representing an image being transmitted. The receiver 7 demodulates the carrier signal to extract the output encoded sequence of hierarchal codes and stores the same in respective locations in a RAM 10 forming part of the decoder section 102. An output decoder 8 is included in the decoder section 102 for converting the output encoded sequence of hierarchal codes in the RAM 10 into a corresponding sequence of hierarchal codes, which are also stored in respective locations in the RAM 10. The decoder section 102 further includes a conventional digital processor 9 which executes a decoding program routine for converting the sequence of hierarchal codes in the RAM 10 into a primary array of intensity values, the primary array of intensity values also being stored in respective locations in the RAM 10.

The decoder section 102 further includes a display device 11 for converting the primary array of intensity values in the RAM 10 into appropriate display signals representing the image being transmitted. The image is then presented on a video screen of the display device 11.

It should be noted that the encoder section 101 and decoder section 102 of the exemplary image coder-decoder system 100 are symmetrical in that each component, except for the RAMs 3 and 10, in one section performs the inverse function of its counterparts in the other section. For example, the receiver 7 performs the inverse of the function of the transmitter 6, and the video display device 11 performs the inverse of the combined functions of the image scanner 1 and the digitizer 2.

The image encoding and decoding techniques of the invention were tested using a Sun Microsystems, Inc. SUN3 workstation serving as the processor 4, RAM 3 and output encoder 5 of the encoder section 101 and also serving as the processor 9, RAM 10 and output decoder 8 of the decoder section 102. In the same test the video monitor connected to a SUN2 workstation by the same manufacturer was used as the display device 11 of the decoder section 102. The functions of the output encoder 5 and the output decoder 8 were performed using respective program routines executed by the SUN3 workstation processor.

An advantageous implementation of the image coder-decoder system 100 is to provide the digitizer 2, the processor 4, the RAM 3, the output encoder 5 and the transmitter 6 of the encoder section 101, and the processor 9, the RAM 10, the output decoder 8 and the receiver 7 of the decoder section 102 on a single integrated circuit chip. In such an implementation the RAM 3 and the RAM 10 may share the same RAM array, and a single appropriately programmed microprocessor may perform the functions of the processors 4 and 9, the output encoder 5 and the output decoder 8. Alternatively, the respective functions of the processors 4 and 9, the output encoder 5 and the output decoder 8 may all be implemented with hard-wired circuits in the integrated circuit chip. It is also possible to incorporate the image scanner 1, excluding certain optical components, as an array of charged-coupled devices (CCD's) on the same integrated circuit chip as the above-mentioned components of the image coder-decoder system.

Figure 2:
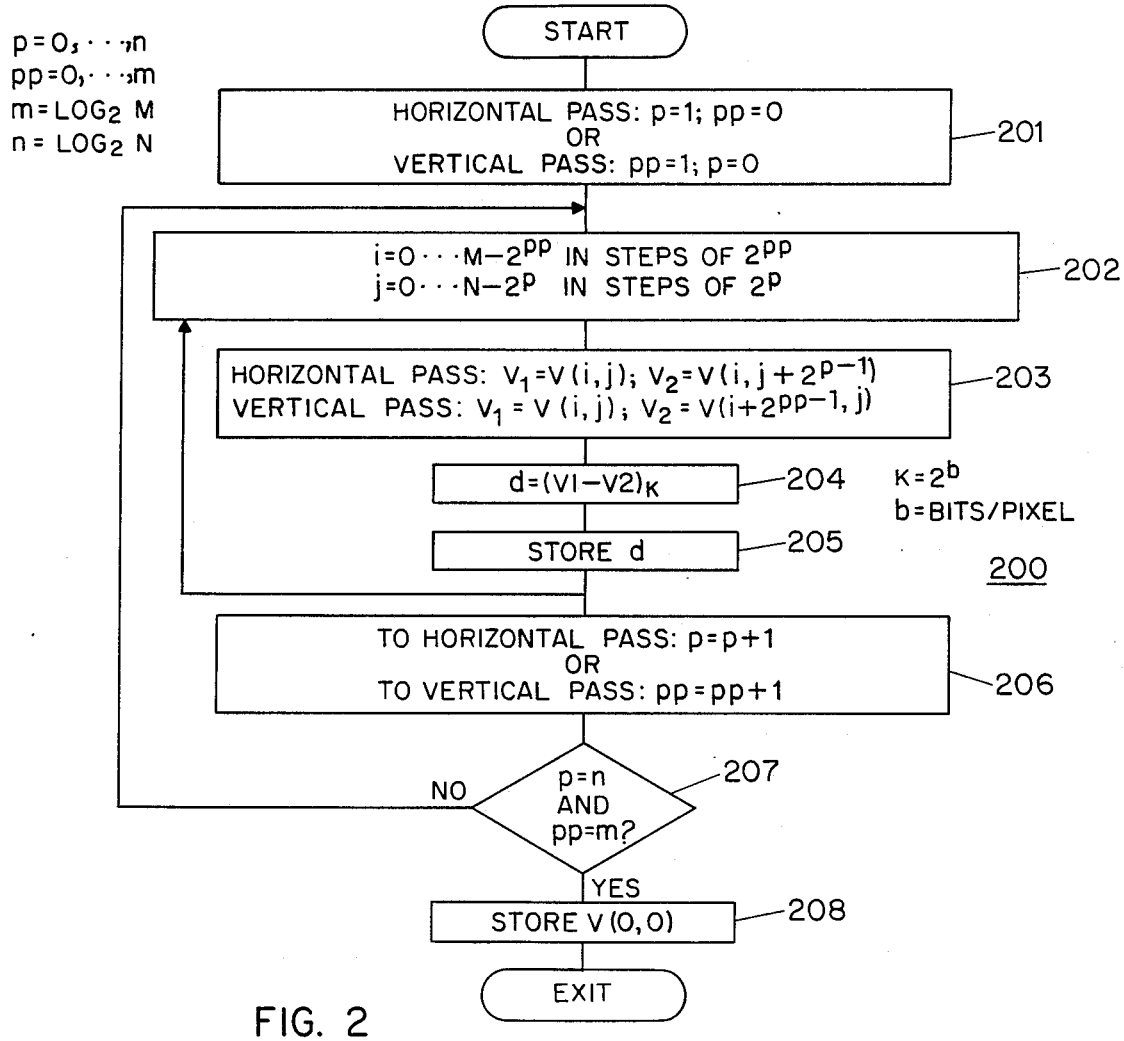
FIG. 2 is a flow diagram of the encoding program routine of the encoder processor in accordance with an exemplary embodiment of the invention.

Turning now to FIG. 2 there is shown a flow diagram representative of the encoding program routine executed by the processor 4 of the encoder section 101 in accordance with an exemplary embodiment of the invention. The program routine represented by the flow diagram 200 provides for converting the primary array of intensity values stored in the RAM 3 of the encoder section into a sequence of hierarchal codes, the number of codes being equal to the number of intensity values in the primary array. The first code in the sequence of hierarchal codes is the binary coded intensity value in the first row and first column of the primary array. The remaining codes in the sequence are the respective modulo K differences of $M \times N - 1$ distinct pairs of intensity values of the primary array. The distinct pairs of intensity values of the primary array are selected in a prescribed manner by making horizontal and vertical passes through the primary array. In block 201 of the flow diagram 200, parameters p and pp are initialized before the first pass. If the first pass is a horizontal pass, p is set to 1 and pp is set to 0. If the first pass is a vertical pass, then pp is set to 1 and p is set to 0. The parameter p has values from 0 to n, where $n = \log_2 N$, and is incremented by 1 before each horizontal pass. The parameter pp has values from 0 to m, where $m = \log_2 M$, and is incremented by 1 before each vertical pass.

The position of an intensity value in the primary array is uniquely specified by a row index, i, indicating the row of the primary array in which the value is located, and a column index, j, indicating the column of the primary array in which the value is located. As represented by block 202 of the flow diagram 200, in each horizontal or vertical pass the row index, i, is varied from 0 to $M - 2^{pp}$ in steps of $2^{pp}$, and the column index, j, is varied from 0 to $M - 2^p$ in steps of $2^p$.

Block 203 of the flow diagram 200 specifies that in each horizontal pass distinct pairs of primary array values, $V_1$ and $V_2$, are selected in accordance with the relations $V_1 = V(i,j)$ and $V_2 = V(i, j + 2^{p-1})$, where V(i, j) is the primary array value located at row i and column j and $V(i, j + 2^{p-1})$ is the primary array value located in row i and column $j + 2^{p-1}$. Furthermore, in each vertical pass distinct pairs of primary array values, $V_1$ and $V_2$, are selected in accordance with the relations $V_1 = V(i,j)$ and $V_2 = V(i + 2^{pp-1}, j)$ where $V(i + 2^{pp-1}, j)$ is the primary array value located at row $i + 2^{pp-1}$ and column j.

Figure 3:
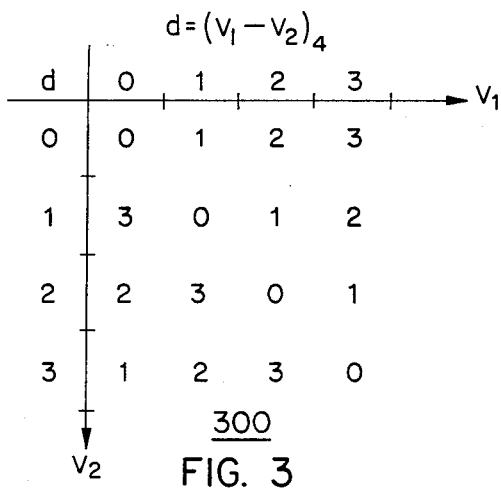
FIG. 3 is a table illustrative of the modulo 4 cyclic difference, d, between 2-bit binary values $V_1$ and $V_2$.

As represented by block 204 of the flow diagram 200, for each distinct pair of primary array values, $V_1$ and $V_2$, selected in a horizontal or vertical pass a modulo K cyclic difference, d, between $V_1$ and $V_2$ is computed, where $K = 2^b$ and b is the number of bits in each binary-coded primary array value. A table useful for computing the modulo 4 cyclic difference between values $V_1$ and $V_2$ is shown in FIG. 3. In that table both $V_1$ and $V_2$ have integer values between 0 and 3 and can therefore be represented by a 2-bit binary code. Accordingly, a modulus of 4 is appropriate for taking the difference between $V_1$ and $V_2$.

In block 205 of the flow diagram 200, each modulo K difference between distinct pairs of primary array values computed in block 204 is stored sequentially in memory.

As represented by block 206 of the flow diagram 200, the parameter p is incremented by 1 prior to each horizontal pass, and the parameter pp is incremented by 1 prior to each vertical pass.

The decision block 207 represents a test to determine whether the parameter p equals n and the parameter pp equals m after each incrementation of p or pp. If the test is negative, a new horizontal pass or vertical pass is made, as determined by preestablished procedure. If the test is affirmative, the value in the first row and first column of the primary array is stored as the first code in the sequence of hierarchal codes, in accordance with block 208 of the flow diagram 200, and the encoding of the primary array is completed.

A source code listing of an encoding program routine, codmain5.c, for a $256 \times 256$ pixel image is included in Appendix I. The codmain5.c routine corresponds to the flow diagram 200 with the following exceptions: to facilitate debugging the codmain5.c routine is written in equivalent straight line code instead of the loops indicated in the flow diagram 200; in codmain5.c each pair of values $V_1$ and $V_2$ are derived in an order opposite to that specified in the flow diagram 200; a modulo K difference, d, is taken between $V_2$ and $V_1$ instead of between $V_1$ and $V_2$, as indicated in the flow diagram 200, and is offset by an arbitrary amount, 100, to facilitate image recognition-when an image is generated from the sequence of hierarchal codes without decoding; the first code in the sequence of hierarchal codes is the value in the last row and last column of the primary array instead of the value in the first row and first column, as indicated in the flow diagram 200; and the sequence of hierarchal codes are stored in reverse order by codmain5.c. A routine invert.c is used to invert the sequence stored by codmain5.c into its proper order for hierarchal transmission. A source code listing of the invert.c routine is also included in Appendix I.

Figure 4:
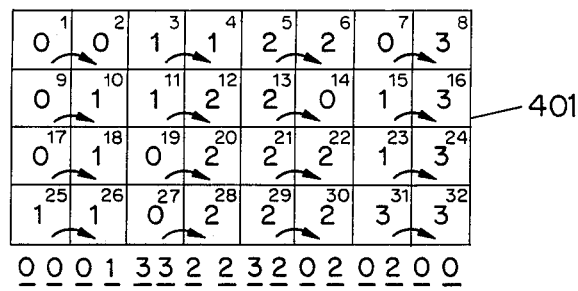
FIG. 4 are diagrams representing the primary array and undersampled arrays with corresponding sequences of hierarchal codes derived therefrom, the diagrams being illustrative of the horizontal and vertical passes of the encoding procedure in accordance with an exemplary embodiment of the invention.
Figure 4:
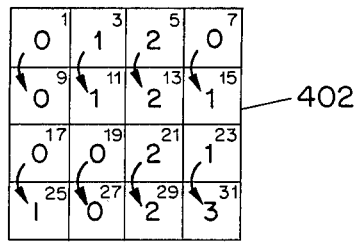
Figure 4:
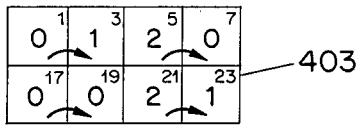
Figure 4:
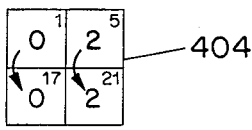
Figure 4:
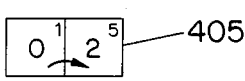
Figure 4:
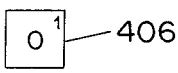

Referring now to FIG. 4, there are shown diagrams representing the primary array 401 and undersampled arrays 402-406 derived from the primary array 401 to illustrate the encoding process represented by the flow diagram 200 of FIG. 2. For purposes of the illustration, the primary array 401 is assumed to have 4 rows and 8 columns (i.e., M=4 and N=8) and to have intensity values in the range from 0 to 3 in integer steps. Accordingly, the primary array 401 is represented as a grid having 32 positions, and each grid position has a number from 0 to 3 representing an intensity value and another number from 1 to 32 at the upper right hand corner denoting the position in the grid. As shown in the primary array diagram 401, the first pass is a horizontal pass in which distinct adjoining pairs of primary array values, as indicated by the arrows, are selected along each row from left to right, beginning with the first row and progressing downward to the last row. For each pair of primary array values selected in sequence, the modulo 4 difference between the first value and the second value of the pair is computed in accordance with the table of FIG. 3. The sequence of modulo 4 differences between the pairs of primary array values selected in the first horizontal pass is shown immediately beneath the primary array diagram 401.

Following the first horizontal pass, a vertical pass is made as illustrated by the undersampled array diagram 402. The undersampled array diagram 402 is derived by eliminating every second column from the primary array diagram 401. The first vertical pass is then made by selecting vertically adjoining pairs of value, as indicated by the arrows, from the undersampled array diagram 402 in sequence proceeding from left to right pairing the first two rows and then proceeding from left to right pairing the second two rows. The modulo 4 differences between the pairs of values selected in the first vertical pass are then computed in the sequence of their selection and added to the sequence obtained in the first horizontal pass, as shown by the sequence of values beneath the undersampled array diagram 402, in which the added values are underscored.

After completing the first vertical pass a second horizontal pass is made, as illustrated by the undersampled array diagram 403. Diagram 403 is derived by eliminating every second row from the undersampled array diagram 402. In the second horizontal pass, horizontally adjoining pairs of values, as indicated by the arrows, are selected in sequence from the undersampled array diagram 403 proceeding from left to right in the first row and then proceeding from left to right in the second row. The modulo 4 difference of each pair of values selected in the second horizontal pass is computed in the sequence of their selection and added to the modulo 4 differences computed in the first horizontal pass and the first vertical pass. The sequence of modulo 4 differences obtained after the second horizontal pass is shown beneath the undersampled array diagram 403, the added values in the sequence being underscored.

Following the second horizontal pass, a second vertical pass is made, as illustrated by the undersampled array diagram 404. Diagram 404 is derived by eliminating every second column from the undersampled array diagram 403. In the second vertical pass, vertically adjoining pairs of values, as indicated by the arrows, are selected in sequence proceeding from left to right. The modulo 4 difference between each selected pair of values is computed in the sequence of their selection, in accordance with the table of FIG. 3. The computed sequence of modulo 4 differences computed in the second vertical pass are added to the sequence of differences computed in earlier passes, as shown in the sequence of values beneath the undersampled array diagram 404, in which the added values are underscored.

After completion of the second vertical pass, a third horizontal pass is made, as illustrated by the undersampled array diagram 405. Diagram 405 is derived by eliminating the second row from the undersampled array diagram 404. In the third horizontal pass, the cyclic difference between the single pair of horizontally adjoining values in the undersampled array 405 is computed and added to the right of the sequence of modulo 4 differences computed in earlier passes, as shown in the sequence of values beneath the undersampled array diagram 405 in which the added values are underscored. Following the third horizontal pass, an undersampled array diagram 406 is derived by eliminating the second column (grid position 5) from the undersampled array diagram 405. Diagram 406 contains a single value, which is the value in the first row and first column of the primary array diagram 401. This value is added to the right of the sequence of modulo 4 differences obtained in the prior passes, as shown in the sequence of values beneath the undersampled array diagram 406 in which the added value is underscored. This sequence of values, when expressed as binary codes, is the sequence of hierarchal codes representative of the primary array of values in diagram 401.

Although the foregoing illustrative example uses alternating horizontal and vertical passes in selecting the distinct pairs of primary array values for computing the sequence of cyclic differences, the encoding process in accordance with the present invention contemplates other predetermined combinations of horizontal and vertical passes providing a procedure for the selection of distinct pairs of primary array values. In addition, the pair selection procedure may be such that the undersampled array for each vertical or horizontal pass is derived by eliminating every other column or row, respectively, of the previous undersampled array beginning with the first column or row instead of the second, as illustrated in the example of FIG. 4. Furthermore, the cyclic difference need not be taken between the first value and the second value of each selected pair as in the illustrative example, but may be taken between the second value and the first value of each selected pair. Moreover, the first code in the sequence of hierarchal codes need not be the value in the first row and first column of the primary array but may be another specified primary array value, such as the value in the last row and last column of the primary array. It should be noted that while the undersampled array diagrams 402–406 are useful for the purposes of illustrating the horizontal and vertical passes of the encoding procedure in accordance with the invention, such undersampled arrays need not be actually derived in the encoding process.

Figure 5:
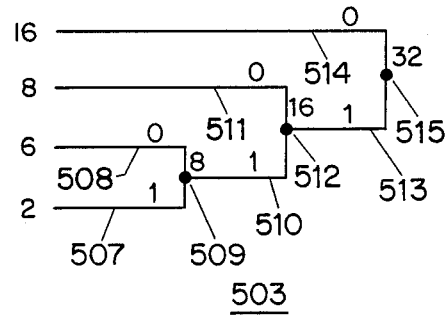
FIG. 5 illustrates the conversion of the hierarchal codes, derived by the encoding procedure illustrated in FIG. 4, into corresponding Huffman codes.

Referring now to FIG. 5, there is shown an illustrative example of the output encoding of the sequence of hierarchal codes 501 derived in the encoding example of FIG. 4. As mentioned above, the purpose of output encoding is to reduce the total number of bits needed to represent a sequence of hierarchal codes derived in accordance with the invention. Such a reduction may be achieved by using well-known variable length coding techniques, such as Huffman encoding, which converts the fixed-length binary codes of the sequence of hierarchal codes into corresponding codes of variable length, i.e., variable number of bits. The total number of bits in the resulting output encoded sequence is less than that of the sequence of hierarchal codes. A description of the well known Huffman encoding technique may be found in a textbook by A. J. Viterbi and J. K. Omura, entitled *Principles of Digital Communication and Encoding,* published by the McGraw-Hill Book Company and also in a textbook by R. Gallager, entitled *Information Theory and Reliable Communication,* published by J. Wiley and Bond, Inc., 1968.

The sequence of hierarchal codes 501 derived in the example of FIG. 4 has 32 codes (shown in decimal representation), including a first code 505 and a last code 506. Each code of the sequence has a quantized value of 0, 1, 2 or 3. A table 502 is constructed listing the number of occurrences of each quantized value in the sequence 501. Huffman coding assigns an output code having the least number of bits to the most frequently occurring code values in the sequence 501 and codes having the largest number of bits to the least frequently occurring code values in the sequence 501.

The assignment of Huffman codes to the code values of the sequence 501 is illustrated by the branch diagram 503. To construct the branch diagram 503, the number of occurrences of each code value in the sequence 501 are listed in descending order. Branches 507 and 508 extending from the two smallest number of occurrences and joined at a node 509 are first drawn. The sum 8 of the numbers 2 and 6 which are joined by branches 507 and 508 is assigned to node 509. Next, branches 510 and 511 extending respectively from the two smallest unjoined numbers, 8 and 8, and joined at a node 512 are drawn. The sum 16 of the numbers 8 and 8 which are joined by branches 510 and 511 is assigned to node 512.

The process continues until branches 513 and 514 extending respectively from the last two unjoined numbers 16 and 16 and joined at a node 515 are drawn. The sum 32 of the numbers 16 and 16 which are joined by branches 513 and 514 is assigned to node 515.

Following the construction of the branch diagram 503, a bit value of 1 is assigned to the lower branch of each pair of joined branches, and a bit value of 0 is assigned to the higher branch of each pair of joined branches. The Huffman code for each code value of the sequence 501 is formed by taking the bit values associated with the branches in the path extending from the number of occurrences of the code value to the remaining unjoined number, 32, in order of increasing significance.

An important feature of the invention is that it provides hierarchal image data which when output encoded with an appropriate data compression coding technique, such as variable length coding, provides a relatively high data compression ratio, the data compression ratio being the ratio of the number of bits in the output encoded image data to the number of bits in the digitized original image. The reason for the relatively high data compression ratio is that the histogram of the intensity values of the original digitized image tends to be relatively flat, and, consequently, the histogram of the respective cyclic differences between pairs of intensity values of the digitized original image is sharply peaked at the value zero. The application of variable length coding to a sequence of such cyclic differences results in a corresponding variable length code sequence in which the shortest code predominates, as may be seen from the Huffman coding example of FIG. 5.

A further increase in data compression ratio may be obtained by detecting any large monotone areas in the image prior to encoding. Since monotone areas can be efficiently coded- by a single intensity value and additional codes defining the extent of the monotone area, the sequence of hierarchal codes representing the image need not include the cyclic differences corresponding to intensity values in the monotone areas.

The image encoding and decoding techniques in accordance with the invention may be used in conjunction with known prediction techniques to further increase the image data compression ratio. Since the encoded image can often be recognized by its general features, which are repeated several times throughout the sequence of hierarchal codes representing the image, the decoder by analyzing only a portion of the sequence of hierarchal codes can predict the remainder of the sequence by identifying the image from a file of such images stored at the receiver.

Figure 6:
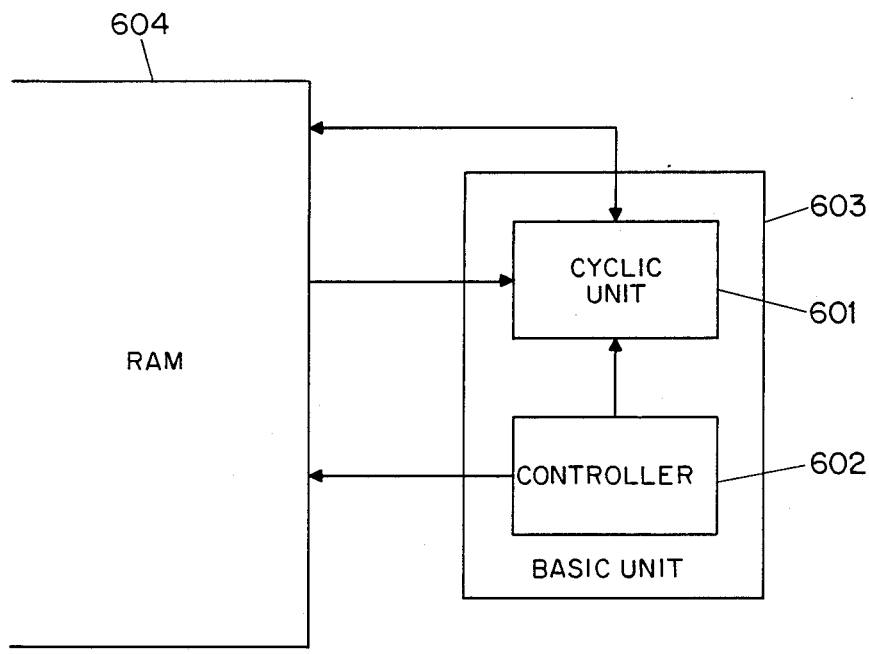
FIG. 6 is a more detailed block diagram of the encoder or decoder processor in accordance with an alternative embodiment of the present invention.

Turning now to FIG. 6, there is shown a block diagram 600 of a hardwired basic unit 603, which may be substituted for the processor 4 and its encoding program routine in the encoding section 101 of the image coder-decoder 100 of FIG. 1. The hardwired basic unit 603 includes a controller 602 which addresses a RAM 604 to read selected pairs of primary array values and a selected primary array value in accordance with the selection procedure specified in the flow diagram 200 of FIG. 2. The selected pairs of primary array values and the single selected primary array value are provided in sequence to a cyclic unit 601 forming part of the basic unit 603.

The cyclic unit 601 under the control of the controller 602 computes the cyclic difference of each pair of primary array values it receives and provides the difference to the RAM 604. The difference is stored in the RAM 604 at an address provided by the controller 602. The single selected primary array value received by the cyclic unit is returned to the RAM 604 for storage at an address provided by the controller 602.

Figure 7:
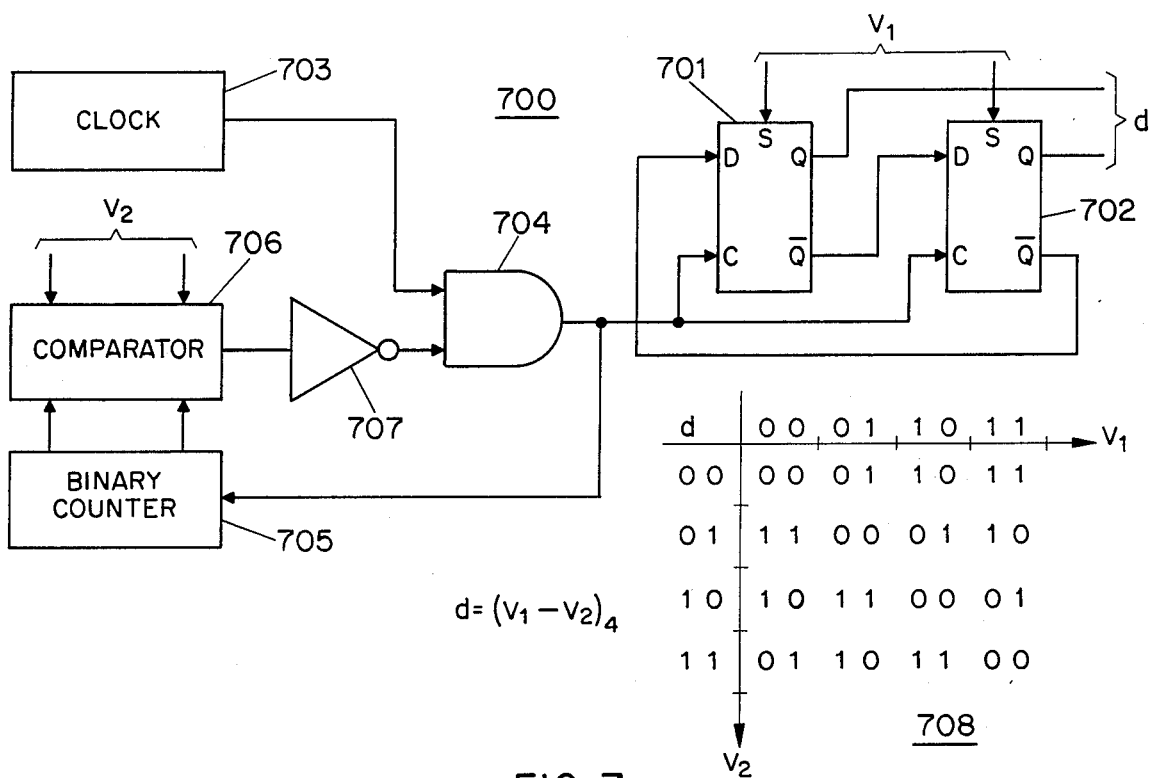
FIG. 7 is a circuit diagram of a feedback shift register of the type useful as the cyclic unit of the encoder or decoder processor of FIG. 6 and a table showing the input and output states of the feedback shift register circuit.

Referring now to FIG. 7, there is shown a schematic diagram of an exemplary feedback shift register circuit 700 of the type which may be used as the cyclic unit 601 in the basic unit 603 of FIG. 6. The circuit 700 is formed by interconnecting two type-D flip-flops 701 and 702. For each selected pair of primary array values, $V_1$ and $V_2$, received by the cyclic unit, the cyclic difference between those values is obtained by loading the value of $V_1$ into the shift register and then applying a number of clock pulses equal to the value of $V_2$ to each of the flip-flops 701 and 702. For the present illustrative example, the primary array values $V_1$ and $V_2$ are each binary codes of two bits. The value $V_1$ is first loaded into the shift register 700 by clearing the flip-flops 701 and 702 and applying the respective bit values of $V_1$ to the SET inputs of those flip-flops. A series of clock pulses equal in number to $V_2$ are then applied to each flip-flop. The binary code of the difference, d, between $V_1$ and $V_2$ is then taken from the Q outputs of the flip-flops 701 and 702.

An exemplary circuit for converting the value $V_2$ into a series of clock pulses equal in number to $V_2$ comprises a clock generator 703 coupled to the clock inputs of the flip-flops 701 and 702 through a 2-input AND gate 704. The output of the AND gate 704 is also received by a binary counter 705. The state of the binary counter 705 is compared with $V_2$ in a digital comparator 706, the output of which is connected through an inverter 707 to the other input of the AND gate 704. Thus, when the state of the binary counter 705 is less than $V_2$, the output of the digital comparator 706 is 0 and the AND gate 704 is enabled to pass the clock pulses from the clock generator 703. When the state of the binary counter 705 is equal to or greater than $V_2$, the output of the digital comparator 706 goes to 1 to disable the AND gate 704, and no further clock pulses are permitted to pass to the flip-flops 701 and 702. The relationship between the binary codes for $V_1$ and $V_2$ and the states of the flip-flops 701 and 702 representing the binary code for the cyclic difference, d, is illustrated in the table 708.

The controller 602 of the basic unit 603 of FIG. 6 for use in the encoder section 101 of FIG. 1 may be implemented as a hardwired finite state circuit based on the encoding flow diagram 200 of FIG. 2. The design of such a circuit is well known to those skilled in the art of digital circuit design and is therefore not further described. It is therefore apparent that the encoding procedure in accordance with the present invention may be implemented with relatively simple circuits.

Figure 8:
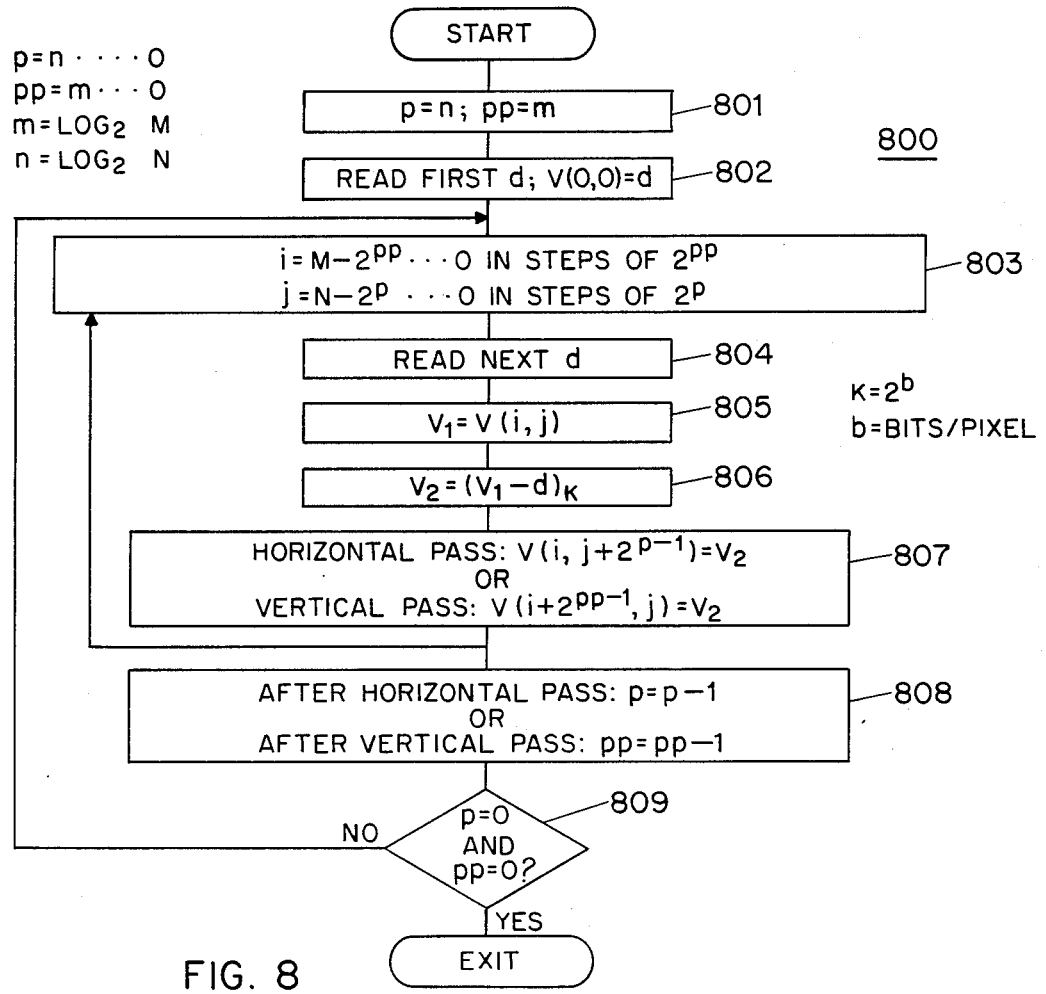
FIG. 8 is a flow diagram of the decoding program routine of the decoder processor in accordance with an exemplary embodiment of the invention.

Turning now to FIG. 8, there is shown a flow diagram 800 of the decoding program routine which is executed by the processor 9 of the decoder section 102 of the image coder-decoder system 100 of FIG. 1. The flow diagram 800 specifies a decoding process for converting a sequence of hierarchal codes derived in the manner described above in connection with FIGS. 2, 3, and 4 into a primary array of values representative of the encoded image. The process specified by the flow diagram 800 is the inverse of that specified by the flow diagram 200 of FIG. 2.

Block 801 of the flow diagram 800 represents the step of setting a parameter p to the value n and setting another parameter pp to the value of m, where $n = \log_2 N$ and $m = \log_2 M$. As before, the integers M and N denote the number of rows and the number of columns of the primary array, respectively.

Block 802 of the flow diagram 800 represents the step of reading the first code, d, in the sequence of hierarchal codes from the RAM 10. In accordance with the encoding procedure of FIG. 2, this first code, d, is the primary array value $V(0,0)$ belonging in the first row and the first column. Therefore, the first code of the sequence of hierarchal codes is stored in a location in the RAM 10 corresponding to the first row and first column of the primary array.

Block 803 of the flow diagram 800 represents varying the row index, i, from $M - 2^{pp}$ to 0 in steps of $2^{pp}$ and varying the column index, j, from $N - 2^p$ to 0 in steps of $2^p$. For each variation of the indices i and j, the next code in the sequence of hierarchal codes is read from the RAM 10 as represented by block 804. A pair of primary array values, $V_1$ and $V_2$, are then derived in the steps represented by blocks 805–806. In block 805 the value $V_1$ is taken as the value, $V(i,j)$ belonging in the $i^{th}$ row and $j^{th}$ column of the primary array. In block 806 the value $V_2$ is computed by taking the modulo K difference between the value of $V_1$, as obtained in the step of block 805, and the code, d, read in the step of block 804.

Figure 9:
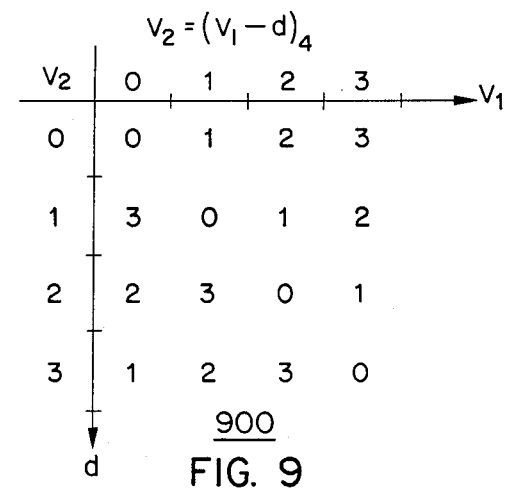
FIG. 9 is a table illustrative of taking the modulo 4 cyclic difference between $V_1$ and d to obtain $V_2$.

The modulus K is equal to $2^b$, where b is the number of bits in each code of the sequence of hierarchal codes and is also the number of bits in each primary array value. An example of taking the modulo 4 difference between $V_1$ and d to obtain $V_2$ is illustrated by the table 900 of FIG. 9. In the table 900 the values $V_1$, $V_2$ and d are integers from 0 to 3. Therefore, each value can be represented by a 2 bit value, and a modulus of 4 if appropriate for taking the cyclic difference between $V_1$ and d.

As represented by block 807, the position in the primary array where the value $V_2$ obtained in the step of block 806 belongs depends on whether the code read in the step of block 804 was derived in a horizontal pass or a vertical pass. If derived in a horizontal pass, the value $V_2$ computed in the step of block 806 belongs in the $i^{th}$ row and the $(j + 2^{p-1})^{th}$ column of the primary array. If obtained in a vertical pass, the value of $V_2$ computed in the step of block 806 belongs in the $(i + 2^{pp-1})^{th}$ row and $j^{th}$ column of the primary array. The values $V_1$ and $V_2$ obtained in the steps of block 805 and 806, respectively, are then stored in appropriate locations in the RAM 10.

Block 808 of the flow diagram 800 represents the step of decrementing the parameter p by 1 after each horizontal decoding pass or decrementing the parameter pp by 1 after each vertical decoding pass. The decision block 809 represents a test to determine whether the parameter p is equal to 0 and the parameter pp is equal to 0 each time p or pp is decremented. If the test is negative, the program routine proceeds to the next horizontal or vertical decoding pass as determined by the encoding procedure used in accordance with the flow diagram 200 of FIG. 2. If the test is affirmative, indicating that the decoding procedure is completed, the decoding program routine represented by the flow diagram 800 is terminated.

A source code listing of a decoding program routine, decmain5.c, is included in Appendix I. The decmain5.c routine corresponds to the flow diagram 800 with the following exceptions: to facilitate debugging the decmain5.c routine is written in straight line code instead of using loops, as in the flow diagram 800; the order for deriving $V_1$ and $V_2$ is inverted from that of flow diagram 800 and the modulo K difference is taken between $V_2$ and d instead of between $V_1$ and d, as in the flow diagram 800; the first code in the sequence of hierarchal codes is taken as the value in the last row and last column of the primary array instead of the value in the first row and first column, as in the flow diagram 800; and the offsets of modulo K differences provided by the codmain5.c routine are removed by the decmain5.c routine.

The decoding procedure specified by the flow diagram 800 may also be implemented with a hardwired basic unit as illustrated in the block diagram 600 of FIG. 6. Referring again to FIG. 6, the controller 602 addresses the RAM 604 to read the first code, d, of the sequence of hierarchal codes stored in the RAM 604. The first code is received by the cyclic unit 601, which causes that code to be stored at an address specified by the controller 602, the address corresponding to the first row and first column of the primary array. Thereafter, the controller 602 addresses the RAM to read a next code of the sequence of hierarchal codes, and a previously stored primary array value from a column and row position determined in accordance with block 803 of the flow diagram 800. The primary array value and the next code are received by the cyclic unit 601, which takes the modulo K difference therebetween and provides that difference to be written in memory at an address provided by the controller 602, the address corresponding to a primary array position determined in accordance with block 807 of the flow diagram 800. The decoding procedure continues in the manner specified by the flow diagram 800 until all values of the primary array have been derived from the sequence of hierarchal codes.

As in the case of the basic unit for the encoder section, the cyclic unit for the decoder section may be implemented as the feedback shift register circuit of the type depicted by the schematic diagram of FIG. 7. The controller 602 may be implemented as a finite state circuit based on the procedure specified by the flow diagram 800. The design of such a circuit is well known to those skilled in the art of digital circuit design and is therefore not further described.

Although in the foregoing illustrative examples, the encoding and decoding techniques in accordance with the invention are carried out serially, it will be recognized by those skilled in the art that such encoding and decoding techniques may be carried out in parallel, since the computation of one cyclic difference between a pair of primary array values or between a primary array value and a hierarchal code is independent of the computation of all other cyclic differences between other pairs of primary array values or between other combinations of primary values and hierarchal codes. Therefore, the implementation of the image encoding and decoding techniques of the invention using known parallel processing techniques would be an obvious alternative to those skilled in the art.

In the encoding example of FIGS. 2–4, the sequence of hierarchal codes includes one selected primary array value, as its first value, and the remaining hierarchal codes are cyclic differences of selected distinct pairs of primary values. In some instances, it may be desirable for the sequence of hierarchal codes to include more than one selected primary array value. For example, a primary array having M rows and N columns may be encoded into a sequence of $M \times N$ hierarchal codes having X selected primary array values and Y cyclic differences of Y selected distinct pairs of primary array values, where X is an integer less than M×N and Y=M×N−X. The X selected primary array values may be those which give rise to large cyclic differences, and therefore the encoding of those values would not improve the data compression ratio when the sequence of hierarchal codes are output encoded. By leaving those primary array values uncoded, except for output encoding, the decoding of the sequence to reconstruct the primary array is accordingly simplified.

Another important feature of the invention is the relatively high immunity of the image encoding and decoding technique to noise. Unlike known hierarchal image encoding and decoding techniques, the influence of an error on the reconstructed image is very small. An error in a given code in the sequence merely causes a shift in the intensity values derived after decoding with the erroneous code. Thus an error in the first code of the sequence will result in a uniform shift in each of the decoded primary array values, an error in the second code of the sequence will result in a shift half of the decoded primary array values and errors in subsequent codes will result in intensity shifts in a diminishing number of decoded primary array values. Such shifts in the intensity values of the primary array are less objectionable than the image distortions produced by errors in known hierarchal coding and decoding techniques.

While the invention has been described with reference to exemplary embodiments thereof, it will be understood by those skilled in the art that various modifications and alterations may be made to the described embodiment without departing from the spirit and scope of the invention. For example, the primary array of intensity values from which a sequence of hierarchal codes is derived need not be the digitized original image, i.e., the pixel intensity value array, but may be the digitized original image after block encoding or subband encoding by known techniques. Furthermore, the primary array may also be a transform of the digitized original image obtained from a known two-dimensional transformation technique, such as the Fourier transform or the cosine transform.

I claim:

1. An image encoding system comprising
memory means having a multiplicity of addressable storage locations for storing data;
means for receiving first coded values representative of intensities of picture elements of an image, the first coded values being stored in a primary array in the memory means, the primary array having M rows and N columns where M and N are predetermined integers;
first encoding means responsive to the first coded values for generating a sequence of M×N second coded values stored in respective locations in the memory means, the sequence of second coded values having X selected first coded values followed by Y respective cyclic differences of Y selected distinct pairs of first coded values, where X is an integer less than M×N and Y is an integer equal to M×N−X; and
second encoding means responsive to the second coded values for generating a sequence of output codes corresponding to the sequence of second coded values.

2. The image encoding system of claim 1, wherein the sequence of hierarchal codes has as its first code a selected first coded value followed by M×N−1 respective cyclic differences of M×N−1 selected distinct pairs of first coded values.

3. The image encoding system of claim 2, wherein the M rows of the primary array include a first row, the N columns of the primary array include a first column and the selected first coded value is the value in the first row and the first column of the primary array.

4. The image encoding system of claim 2, wherein each first coded value is a binary code having b bits and the first encoding means comprises:
means for selecting pairs of first coded values by making horizontal and vertical passes, in each horizontal pass pairs of first coded values, $V_1$ and $V_2$, are selected in accordance with the relations $V_1 = V(i,j)$ and $V_2 = V(i,j+2^{p-1})$, where $V(i,j)$ is the first coded value in the $i^{th}$ row and $j^{th}$ column of the primary array, $V(i,j+2^{p-1})$ is the first coded value in the $i^{th}$ row and $(j+2^{p-1})^{th}$ column of the primary array, i has values from 0 to $M-2^{pp}$ in steps of $2^{pp}$, j has values from 0 to $N-2^p$ in steps of $2^p$, p has values from 0 to $\log_2 M$ and is incremented by 1 before each horizontal pass, pp has values from 0 to $\log_2 N$ and is incremented by 1 before each vertical pass, and in each vertical pass pairs of first coded values, $V_1$ and $V_2$, are selected in accordance with the relations $V_1 = V(i,j)$ and $V_2 = V(i+2^{pp-1},j)$, where $V(i+2^{pp-1},j)$ is the first coded value in the $(i+2^{pp-1})^{th}$ row and $j^{th}$ column of the primary array; and
means for taking the modulo K cyclic difference between each pair of first coded values selected in each horizontal and vertical pass, where $K = 2^b$ and each modulo K difference has a position C in the sequence of second coded values determined by the relations $$C = (M \times N)\left(1 - \sum_{z=1}^{p+pp-1} \frac{1}{2^z}\right) - P \text{ and}$$

$$P = \left(\frac{i + 2^{pp}}{2^{pp}} - 1\right) \times \frac{N}{2^p} + \frac{j + 2^p}{2^p}.$$

5. The image encoding system of claim 4, wherein the means for selecting pairs of first coded values makes alternating horizontal and vertical passes.

6. The image encoding system of claim 4, further comprising image scanning means for providing the first coded values representative of the intensities of the picture elements of the image.

7. The image encoding system of claim 6, wherein the image scanning means includes means for decomposing the image into a pixel array having M rows and N columns, and means for deriving binary coded values corresponding to respective image intensities of the pixels.

8. An image decoding system comprising
means for receiving a sequence of output encoded values representative of an image;
memory means having a multiplicity of addressable storage locations for storing data;
first decoding means responsive to the sequence of output encoded values for providing a corresponding sequence of first coded values stored in respective locations of the memory means;
second decoding means responsive to the sequence of first coded values for deriving a primary array of second coded values stored in respective locations in the memory means, the primary array having M rows and N columns, where M and N are predetermined integers, the sequence of first coded values including X values belonging to specified positions of the primary array followed by Y respective cyclic differences of Y distinct pairs of values belonging to specified positions of the primary array, where X is an integer less than M×N and Y is an integer equal to M×N−X; and third decoding means responsive to the primary array of second coded values for providing display signals representative of the image.

9. The image decoding system of claim 8, wherein the sequence of first coded values begins with one value belonging to a specified position of the primary array followed by M×N−1 respective cyclic differences of M×N−1 distinct pairs of values belonging to specified positions of the primary array.

10. The image decoding system of claim 9, wherein each second coded value of the primary array is a binary code of b bits, and the second decoding means includes means for deriving the M×N−1 distinct pairs of second coded values in horizontal and vertical passes, in each horizontal pass pairs of second coded values, $V_1$ and $V_2$, are derived from respective sequential first coded values, d, in accordance with the relations $V_1 = V(i,j)$ and $V_2 = (V_1 - d)_K = V(i, j+2^{p-1})$, where $V(i,j)$ is the second coded value in the $i^{th}$ row and $j^{th}$ column of the primary array, $V(i, j+2^{p-1})$ is the second coded value in the $i^{th}$ row and $(j+2^{p-1})^{th}$ column of the primary array, i has values from $M - 2^{pp}$ to 0 in steps of $2^{pp}$, j has values from $N - 2^p$ to 0 in steps of $2^p$, p has values from $\log_2 N$ to 0 and is decremented by 1 after each horizontal pass, pp has values from $\log_2 M$ to 0 and is decremented by 1 after each vertical pass, $(V_1 - d)_K$ is the modulo K cyclic difference between $V_1$ and d, and in each vertical pass pairs of second coded values, $V_1$ and $V_2$, are derived from respective sequential first coded values, d, in accordance with the relations $V_1 = V(i,j)$ and $V_2 = (V_1 - d)_K = V(i+2^{pp-1}, j)$, where $V(i+2^{pp-1}, j)$ is the second coded value in the $(i+2^{pp-1})^{th}$ row and $j^{th}$ column of the primary array.

11. The image decoding system of claim 10, wherein the means for deriving the M×N−1 distinct pairs of second coded values makes alternating horizontal and vertical passes.

12. The image decoding system of claim 8, further comprising display means responsive to the display signals provided by the third decoding means for presenting the image represented by the display signals.

13. A method for encoding an image comprising the steps of:

deriving a primary array of first coded values representative of intensities of picture elements of the image, the primary array having M rows and N columns, where M and N are predetermined integers;

deriving a sequence of M×N second coded values from the first coded values by selecting X distinct first coded values and by selecting Y distinct pairs of first coded values, and taking the cyclic difference of each selected pairs of first coded values, where X is an integer less than M×N and Y is another integer equal to M×N−X, the sequence of second coded values comprising the selected first coded values followed by the respective cyclic differences of the selected pairs of first coded values; and deriving a sequence of output codes corresponding to the sequence of second coded values.

14. The method for encoding an image of claim 13, wherein the M rows of the primary array include a first row and the N columns of the primary array include a first column and the selected first coded value is the value in the first row and the first column of the primary array.

15. The method for encoding an image of claim 14 wherein each first coded value is a binary code having b bits; the step of selecting M×N−1 distinct pairs of first coded values comprises making n horizontal passes and m vertical passes, where $n = \log_2 N$ and $m = \log_2 M$, in each horizontal pass selecting pairs of first coded values, $V_1$ and $V_2$, according to the relations $V_1 = V(i,j)$ and $V_2(i, j+2^{p-1})$ where $V(i,j)$ is the first coded value in the $i^{th}$ row and $j^{th}$ column of the primary array, $V(i, j+2^{p-1})$ is the first coded value in the $i^{th}$ row and $(j+2^{p-1})^{th}$ column of the primary array, i has values from 0 to $M - 2^{pp}$ in steps of $2^{pp}$, j has values from 0 to $N - 2^p$ in steps of $2^p$, p has values from 0 to $\log_2 N$ and is incremented by 1 before each horizontal pass, pp has values from 0 to $\log_2 M$ and is incremented by 1 before each vertical pass, and in each vertical pass selecting pairs of first coded values, $V_1$ and $V_2$, according to the relations $V_1 = V(i,j)$ and $V_2 = V(i+2^{pp-1}, j)$, where $V(i+2^{pp-1}, j)$ is the first coded value in the $(i+2^{pp-1})^{th}$ row and the $j^{th}$ column of the primary array; and the step of taking the cyclic differences of the selected pairs of first coded values comprises taking the modulo K difference between each pair of first coded values, $V_1$ and $V_2$, selected in each horizontal and vertical pass, where $K = 2^b$, and each modulo K difference having a position, C, in the sequence of second coded values according to the relations $$C = (M \times N)\left(1 - \sum_{z=1}^{p+pp-1} \frac{1}{2^z}\right) - P \text{ and}$$

$$P = \left(\frac{i + 2^{pp}}{2^{pp}} - 1\right) \times \frac{N}{2^p} + \frac{j + 2^p}{2^p}.$$

16. The method of encoding an image of claim 15, wherein the step of making n horizontal and m vertical passes include making alternating horizontal and vertical passes.

17. The method of encoding an image of claim 15, wherein the step of taking the modulo K cyclic difference between each pair of first coded values, $V_1$ and $V_2$, selected in each horizontal and vertical pass comprises taking the modulo K cyclic difference between $V_1$ and $V_2$.

18. A method for decoding an image comprising the steps of:

deriving a sequence of M×N first coded values representative of intensities of picture elements of an image, where M and N are predetermined integers;

deriving a primary array of corresponding second coded values from the sequence of first coded values, the primary array having M rows and N columns and the sequence of first coded values having X distinct values belonging to specified positions of the primary array followed by Y respective cyclic differences of Y distinct pairs of values belonging to specified positions of the primary array, where X is an integer less than M×N and Y is an integer equal to M×N−X; and deriving display signals representative of the image from the primary array of second coded values.

19. The method of decoding image data of claim 18, wherein the sequence of second coded values begins with one value belonging to a specified position of the primary array followed by M×N−1 respective cyclic differences of M×N−1 distinct pairs of values belonging to specified positions of the primary array.

20. The method of decoding an image of claim 19, wherein the second coded values are binary codes having b bits and the step of deriving the primary array of second coded values comprises making n horizontal passes and m vertical passes, where n=log$_2$N and m=log$_2$M; in each horizontal pass deriving pairs of second coded values, $V_1$ and $V_2$, from respective sequential first coded values, d, according to the relations $V_1=V(i,j)$ and $V_2=(V_1-d)_K=V(i,j+2^{p-1})$, where $V(i,j)$ is the second coded value in the $i^{th}$ row and $j^{th}$ column of the primary array, $V(i,j+2^{p-1})$ is the second coded value in the $i^{th}$ row and $(j+2^{p-1})$th column of the primary array, i has values from M−$2^{pp}$ to 0 in steps of $2^{pp}$, j has values from N−$2^p$ to 0 in steps of $2^p$, p has values from n to 0 and is decremented by one after each horizontal pass, pp has values from m to 0 and is decremented by one after each vertical pass, and $(V_1-d)_K$ is the modulo K cyclic difference between $V_1$ and d, and K is equal to $2^b$; and in each vertical pass deriving pairs of second coded values, $V_1$ and $V_2$, from respective sequential first coded values, d, according to the relations $V_1=V(i,j)$ and $V_2=(V_1-d)_K=V(i+2^{pp-1},j)$, where $V(i+2^{pp-1},j)$ is the second coded value in the $(i+2^{pp-1})^{th}$ row and the $j^{th}$ column of the primary array.

21. The method of decoding an image of claim 20, wherein the step of making n horizontal and m vertical passes include making alternating horizontal and vertical passes.

* * * * *